(12) United States Patent
Mizuno et al.

(10) Patent No.: US 11,163,469 B2
(45) Date of Patent: Nov. 2, 2021

(54) DATA MANAGEMENT SYSTEM AND DATA MANAGEMENT METHOD

(71) Applicant: HITACHI, LTD., Tokyo (JP)

(72) Inventors: Kazuhiko Mizuno, Tokyo (JP); Tsuyoshi Tanaka, Tokyo (JP); Yohsuke Ishii, Tokyo (JP)

(73) Assignee: HITACHI, LTD., Tokyo (JP)

(*) Notice: Subject to any disclaimer, the term of this patent is extended or adjusted under 35 U.S.C. 154(b) by 86 days.

(21) Appl. No.: 16/566,278

(22) Filed: Sep. 10, 2019

(65) Prior Publication Data

US 2020/0301585 A1  Sep. 24, 2020

(30) Foreign Application Priority Data

Mar. 18, 2019  (JP) .............................. JP2019-050411

(51) Int. Cl.
*G06F 3/00* (2006.01)
*G06F 3/06* (2006.01)
*G06F 16/11* (2019.01)
*G06F 11/14* (2006.01)

(52) U.S. Cl.
CPC ............ *G06F 3/064* (2013.01); *G06F 3/0604* (2013.01); *G06F 3/0673* (2013.01); *G06F 16/11* (2019.01); *G06F 3/061* (2013.01); *G06F 3/065* (2013.01); *G06F 3/067* (2013.01); *G06F 11/14* (2013.01); *G06F 16/113* (2019.01)

(58) Field of Classification Search
None
See application file for complete search history.

(56) References Cited

U.S. PATENT DOCUMENTS

| 7,778,413 B2 * | 8/2010 | Hwang | ................... H04L 9/003 380/29 |
| 7,907,722 B2 * | 3/2011 | Timmermans | ........ G06F 21/755 380/28 |

OTHER PUBLICATIONS

Actifio.com, "An SQL Server DBA's Guide to Actifio Copy Data Management".

* cited by examiner

*Primary Examiner* — Midys Rojas
(74) *Attorney, Agent, or Firm* — Volpe Koenig

(57) ABSTRACT

Provided is a data management system capable of properly managing data to undergo masking processing in the secondary use of data. This data storage management system is equipped with a storage unit which stores masked data of real data at a first point in time, and a data control unit which extracts data of a storage area that has not been masked from update data based on first information representing a masked storage area in the masked data and second information representing a masked storage area in the masked data of update data, which is data obtained by updating the real data from the first point in time to a second point in time, extracts data of the masked storage area, from which the same masked data has been removed, from the masked data of the update data, and generates the extracted data as difference data.

7 Claims, 15 Drawing Sheets

FIG. 9

| 910 Vol ID | 920 VOL NAME | 930 GENE- RATION ID | 940 Block ID | 950 UPDATE FLAG | 960 UPDATE DATA | 970 LABEL |
|---|---|---|---|---|---|---|
| 1 | DB01 | 1 | 1 | 1 | 0x00001001 | UPDATE DATA OF TIME T ONWARD |
| | | | 2 | 0 | 0x00000000 | |
| | | | 3 | 0 | 0x00000000 | |
| | | | 4 | 1 | 0x10110000 | |
| | | | 5 | 0 | 0x00000000 | |
| ... | ... | ... | ... | ... | ... | ... |

| 1010 Vol ID | 1020 VOL NAME | 1020 GENE-RATION ID | 1040 Block ID | 1050 UPDATE FLAG | 1060 MASKING FLAG | 1070 MASKING DATA | 1080 LABEL |
|---|---|---|---|---|---|---|---|
| 1 | DB01 | 1 | 1 | 0 | 0x00000000 | 0x00000000 | UPDATE DATA OF MASKING PROCESSING AT TIME T+Δt |
| | | | 2 | 1 | 0x01001001 | 0x00001001 | |
| | | | 3 | 0 | 0x00000000 | 0x00000000 | |
| | | | 4 | 0 | 0x00000000 | 0x00000000 | |
| | | | 5 | 1 | 0x10110101 | 0x10110000 | |
| .. | .. | .. | .. | .. | .. | .. | .. |

521

DATA MANAGEMENT SYSTEM AND DATA MANAGEMENT METHOD

TECHNICAL FIELD

The present invention relates to a data management system and a data management method and, for example, can be suitably applied to a data management system and a data management method for managing masked data.

BACKGROUND ART

As efforts for improving the value of data at low cost, needs for using data sources (backup, archive, business data, copy data, etc.) of routine work (secondary use of data) are increasing.

In the secondary use of data, the capacity used in the storage apparatus is being reduced by copying the backup data acquired by the production system which performs routine work to the development system which performs development, analysis and other tasks, using the copied backup data for development, analysis and other tasks, and managing the update data as the difference data of the backup data (performing difference management).

Moreover, in the secondary use of data, because the backup data of routine work is provided to a third party and used for development, analysis and other tasks, masking processing is performed to information that cannot be disclosed. Data that underwent masking processing (masking data) is managed as real data obtained by applying the difference data to the copy of the backup data.

For example, NPTL 1 copies the copy of the backup data to real data based on the Live Clone function, and performs masking processing based on the Work Flow function.

CITATION LIST

Patent Literature

[NPTL 1] Actifio.com, "An SQL Server DBA's Guide to Actifio Copy Data Management"

SUMMARY OF THE INVENTION

Problems to be Solved by the Invention

Conventionally, in the secondary use of data, in order to perform masking processing to the data that cannot be disclosed, real data obtained by applying the update data to the backup data was subject to masking processing and used. Nevertheless, when there are multiple users, usages and other factors, real data needs to be prepared accordingly, and the capacity of the storage apparatus will be consumed by that much.

The present invention was devised in view of the foregoing points, and an object of this invention is to propose a data management system capable of properly managing data to undergo masking processing in the secondary use of data.

Means to Solve the Problems

In order to achieve the foregoing object, the present invention provides a data management system comprising a storage unit which stores masked data of real data at a first point in time, and a data control unit which extracts, based on first information representing a masked storage area in the masked data and second information representing a masked storage area in the masked data of update data, which is data obtained by updating the real data from the first point in time to a second point in time, data of a storage area that has not been masked from the update data, extracts data of the masked storage area, from which the same masked data has been removed, from the masked data of the update data, and generates the extracted data as difference data.

According to the foregoing configuration, for instance, because it will be possible to generate data requested to be used from the masked data and the difference data, there is no need to prepare real data for each request for use. Moreover, for example, because the masked data that is the same at the first point in time and the second point in time will be removed from the difference data, the data capacity can be reduced.

Advantageous Effects of the Invention

According to the present invention, data can be properly managed.

BRIEF DESCRIPTION OF DRAWINGS

FIG. 9 is a diagram showing an example of the updating information management table according to the first embodiment.

FIG. 10 is a diagram showing an example of the masking information management table according to the first embodiment.

DESCRIPTION OF EMBODIMENTS

Figure 1:
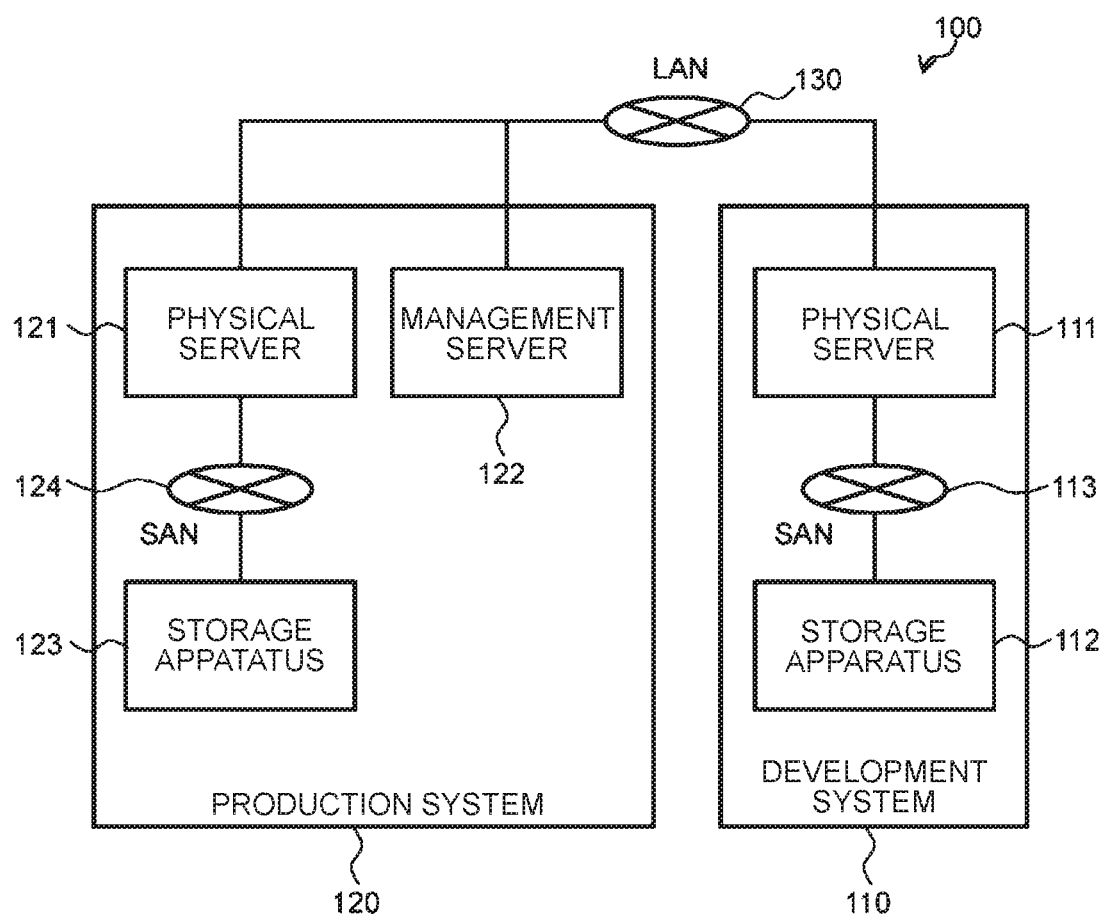
FIG. 1 is a diagram showing an example of the configuration of the data management system according to the first embodiment.

An embodiment of the present invention is now explained with reference to the appended drawings. This embodiment relates to a technology of reducing the capacity used capacity in a storage apparatus and, for instance, can be suitably applied to a technology of reducing data to be stored in a storage apparatus in cases of performing masking processing during the secondary use of data.

In the ensuing explanation, the common part (excluding the branch number) may be used among the reference numerals including the branch number when explaining the same elements without differentiation, and reference numerals including the branch number may be used when differentiating and explaining the same elements. For example, "virtual server 420" may be indicated when explaining the virtual servers without any particular differentiation, and "virtual server 420-1" and "virtual server 420-2" may be indicated when differentiating and explaining the individual virtual servers.

(1) First Embodiment

In FIG. 1, reference numeral 100 represents the overall data management system according to the first embodiment.

FIG. 1 is a diagram showing an example of the configuration of the data management system 100. This embodiment explains a case of applying the data management system 100 to a business system.

The data management system 100 is configured by including a development system 110 and a production system 120. In the data management system 100, the development system 110 and the production system 120 are connected via a LAN (Local Area Network) 130.

The development system 110 is a system used by a user for using a data source of business (secondary use of data) in the production system 120, and is configured by including a physical server 111 and a storage apparatus 112. The physical server 111 and the storage apparatus 112 are connected via a SAN (Storage Area Network) 113. The data source of business in the production system 120 is, for example, backup data of real data, archive data of real data, business data of real data, and copy data of real data, and backup data is used as an example in the following explanation.

The production system 120 is a system used by a user for conducting business, and is configured by including a physical server 121, a management server 122, and a storage apparatus 123. The physical server 121 and the management server 122 are connected via a LAN 130. The physical server 121 and the storage apparatus 123 are connected via a SAN 124.

Figure 2:
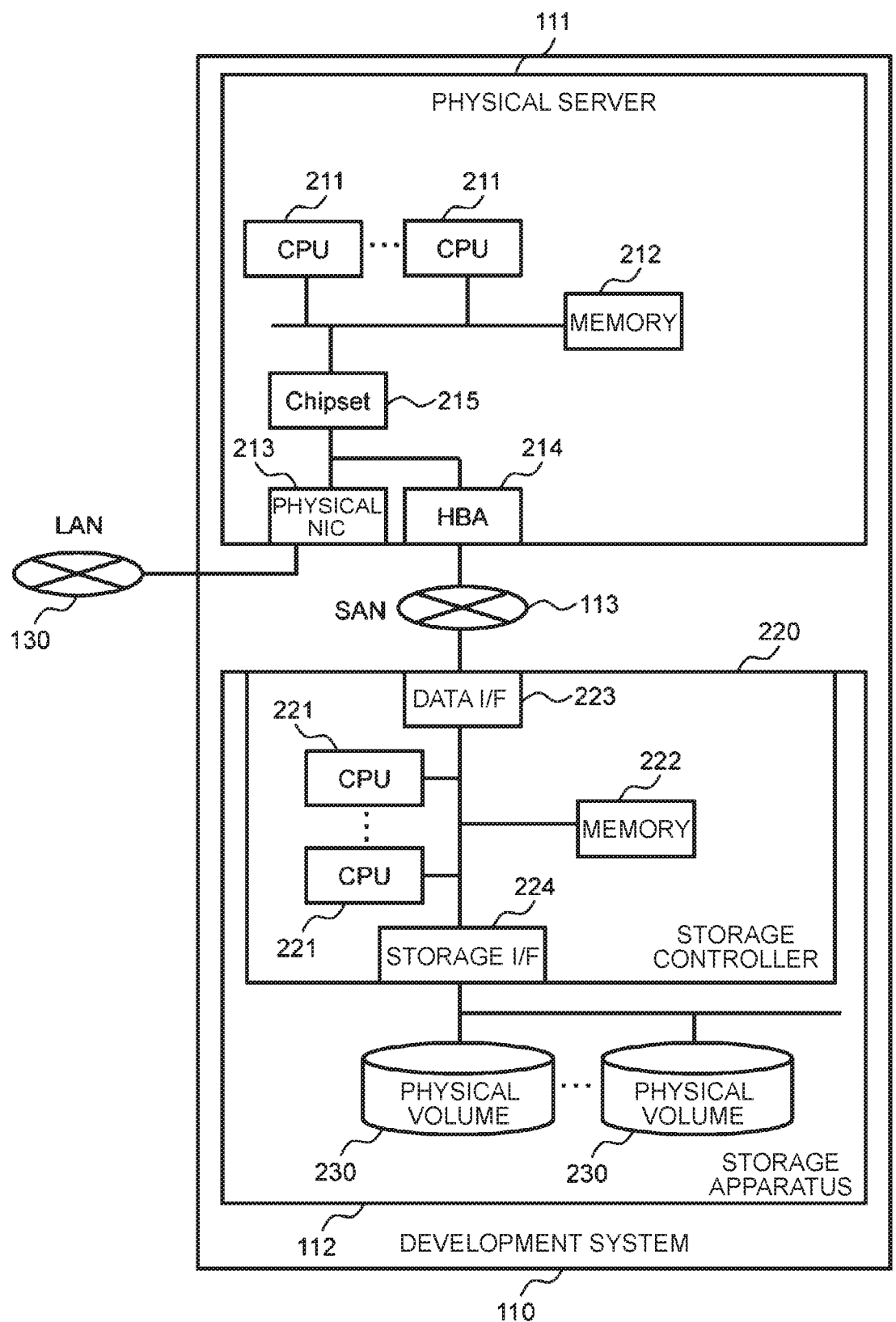
FIG. 2 is a diagram showing an example of the configuration of the development system according to the first embodiment.

FIG. 2 is a diagram showing an example of the configuration of the development system 110.

In the physical server 111, one or more CPUs (Central Processing Unit) 211, a memory 212, a physical NIC 213, and an HBA (Host Bus Adapter) 214 are connected to a Chip Set 215 which manages the passing of data.

The CPU 211 is one example of a control device, and executes various types of processing. The memory 212 is one example of a storage device, and is a RAM (Random Access Memory) or the like, and stores various programs, tables and the like. The physical NIC 213 is one example of hardware that is used for the physical server 111 to communicate with the outside. The HBA 214 is an example of hardware for connecting the physical server 111 and the storage apparatus 112 via the SAN 113.

The storage apparatus 112 is configured by including a storage controller 220 which controls the storage apparatus 112, and a physical volume 230.

The storage controller 220 is configured by including one or more CPUs 221, a memory 222, a data I/F (Interface) 223, and a storage I/F 224. Because the CPU 221 is the same as the CPU 211, the explanation thereof is omitted. Because the memory 222 is the same as the memory 212, the explanation thereof is omitted. The data I/F 223 is an example of hardware for connecting the storage apparatus 112 and the physical server 111 via the SAN 113. The storage I/F 224 is an example of hardware for connecting the storage controller 220 and the physical volume 230.

The data (write data) updated from the physical server 111 and the data (read data) referred to from the physical server 111 are received by the data I/F 223. The storage controller 220 calculates the memory area (storage area) for storing the received data, acquires the storage area of the target physical volume 230 via the storage I/F 224, and performs the update and reference of the data.

Figure 3:
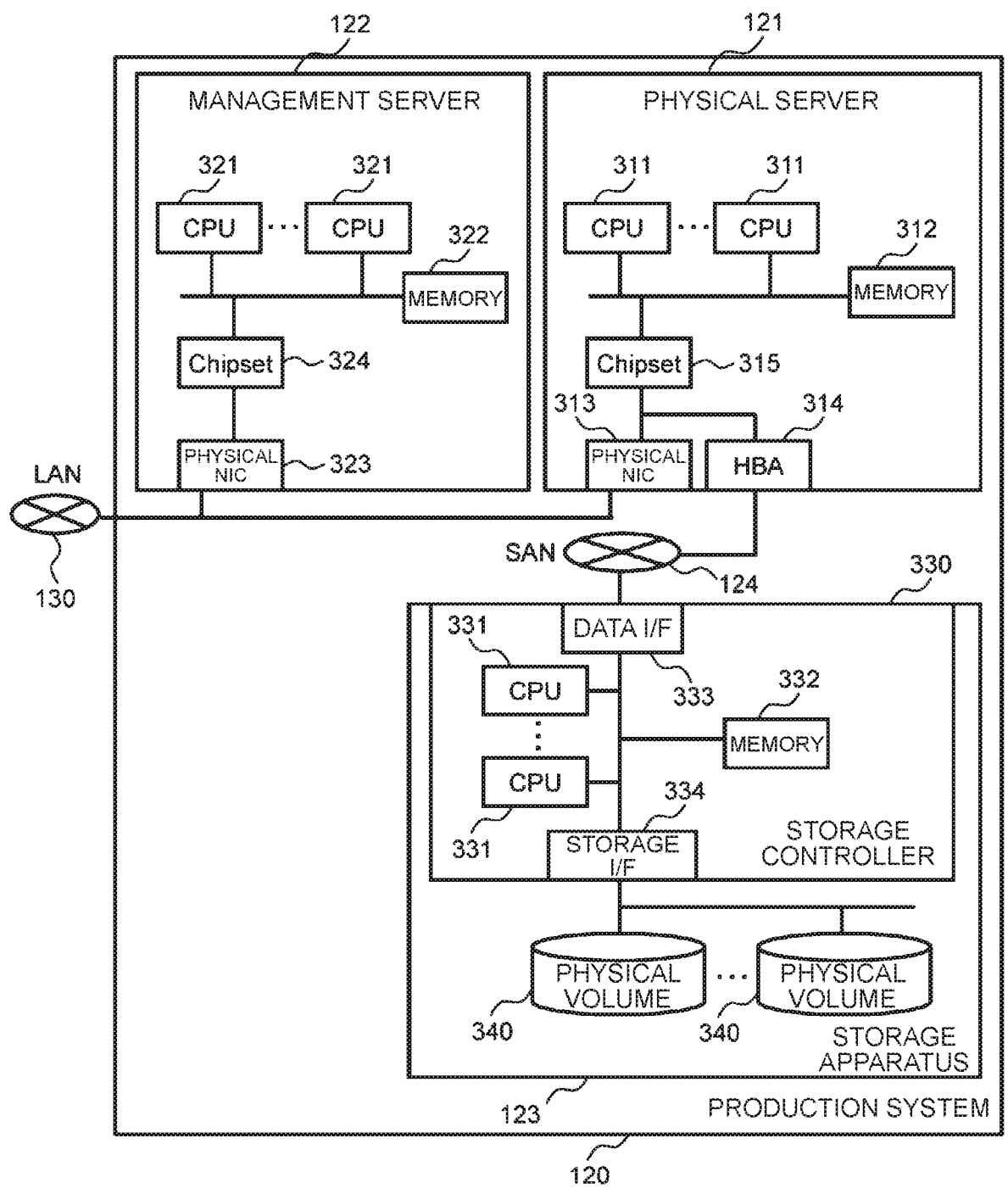
FIG. 3 is a diagram showing an example of the configuration of the production system according to the first embodiment.

FIG. 3 is a diagram showing an example of the configuration of the production system 120. Note that, when the configuration of the production system 120 and the configuration of the development system 110 are the same, the explanation thereof is omitted as appropriate.

Because the respective components (CPU 311, memory 312, physical NIC 313, HBA 314, Chip Set 315) of the physical server 121 are the same as the respective components (CPU 211, memory 212, physical NIC 213, HBA 214, Chip Set 215) of the physical server 111, the explanation thereof is omitted.

In the management server 122, one or more CPUs 321, a memory 322, and a physical NIC 323 are connected to a Chip Set 324 which manages the passing of data. Because the respective components (CPU 321, memory 322, physical NIC 323, Chip Set 324) of the management server 122 are the same as the respective components (CPU 211, memory 212, physical NIC 213, Chip Set 215) of the physical server 111, the explanation thereof is omitted.

Because the respective components (storage controller 330, CPU 331, memory 332, data I/F 333, storage I/F 334, physical volume 340) of the storage apparatus 123 are the same as the respective components (storage controller 220, CPU 221, memory 222, data I/F 223, storage I/F 224, physical volume 230) of the storage apparatus 112, the explanation thereof is omitted.

Figure 4:
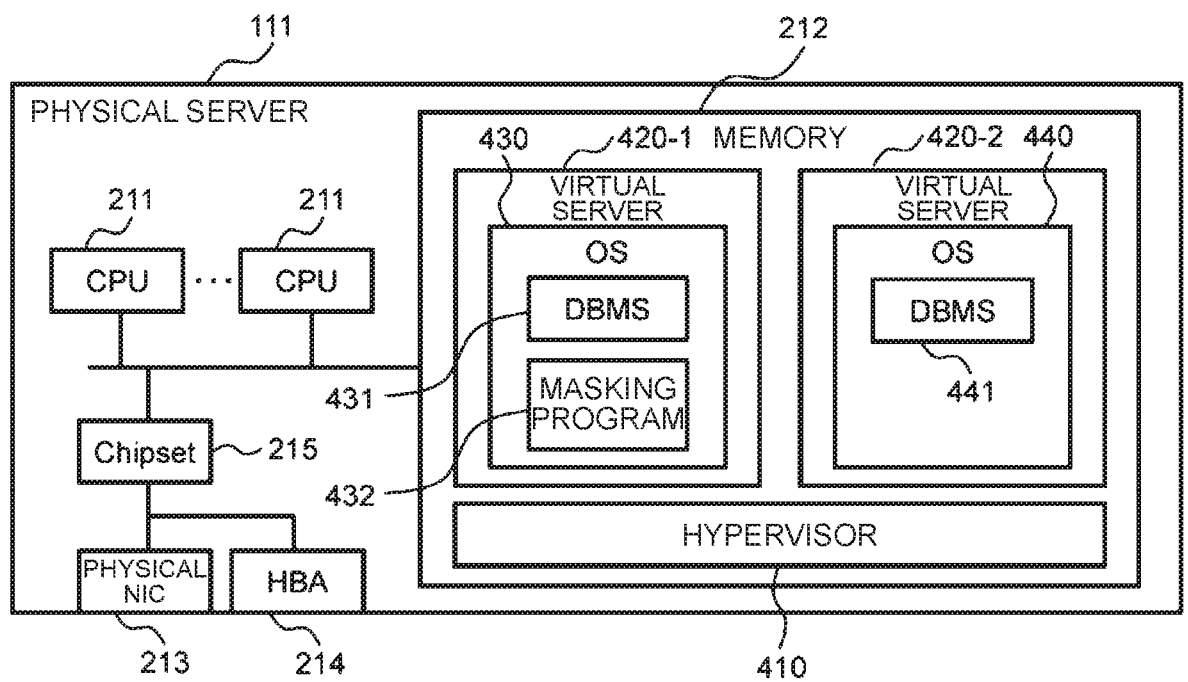
FIG. 4 is a diagram showing an example of the configuration of the physical server according to the first embodiment.

FIG. 4 is a diagram showing an example of the configuration according to the physical server 111 of the development system 110.

The memory 212 of the physical server 111 stores various programs, tables and the like. As a result of the CPU 211 executing programs of the memory 212, the functions (hypervisor 410, virtual server 420, OS 430, OS 440, DBMS 431, masking program 432, etc.) of the physical server 111 are realized.

The functions of the physical server 111 may be realized, for example, by the CPU 211 reading programs from the memory 212 and executing such programs (software), or realized with hardware such as a dedicated circuit, or realized based on the combination of software and hardware. Moreover, a part of the functions of the physical server 111 may be realized with another computer capable of communicating with the physical server 111.

The hypervisor 410 controls one or more virtual servers 420 (for example, virtual server 420-1, virtual server 420-2). In the virtual server 420-1, an OS 430 is running, and a DBMS (Database Management System) 431 and a masking program 432 which performs masking processing are realized based on the OS 430. The DBMS 431 manages, for example, data (for example, backup data of real data) for use in the masking processing. In the virtual server 420-2, an OS 440 is running, and a DBMS 441 is realized based on the OS 440. The masking program 432 performs masking processing to the data (for example, backup data of real data) stored in the DBMS 431. Note that, in the ensuing explanation, data obtained by performing masking processing to the backup data of the real data is hereinafter referred to as masking data (one example of masked data). The DBMS 441 manages, for example, data (for example, masking data of real data, difference data) for use in the secondary use of data.

Figure 5:
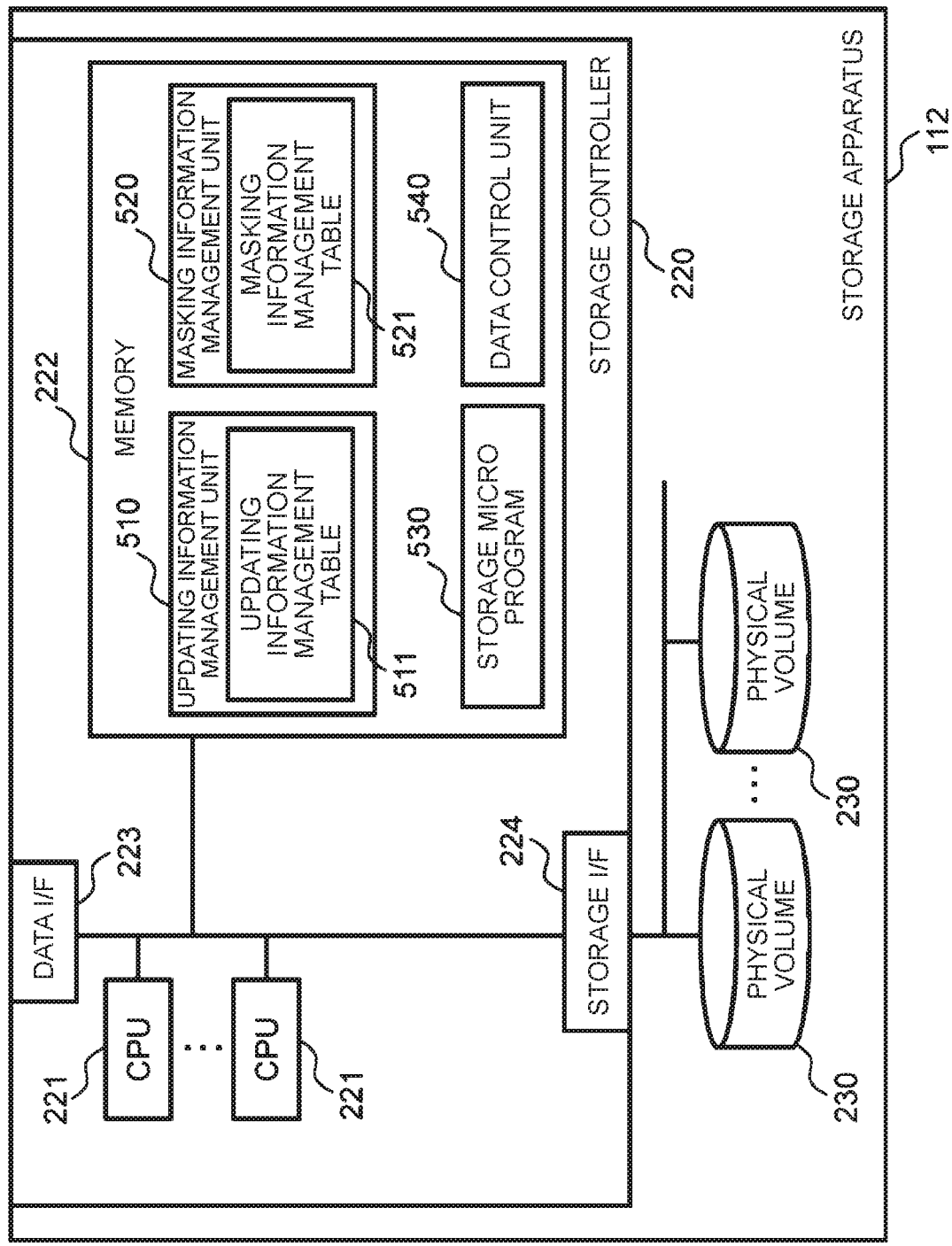
FIG. 5 is a diagram showing an example of the configuration of the storage apparatus according to the first embodiment.

FIG. 5 is a diagram showing an example of the configuration of the storage apparatus 112 of the development system 110.

In the storage apparatus 112, as a result of the CPU 221 executing programs of the memory 222, the functions (updating information management unit 510, masking information management unit 520, storage micro program 530, data control unit 540, etc.) of the storage apparatus 112 are realized.

The functions of the storage apparatus 112 may be realized, for example, by the CPU 221 reading programs from the memory 222 and executing such programs (software), or realized with hardware such a dedicated circuit, or realized based on the combination of software and hardware. Moreover, a part of the functions of the storage apparatus 112 may be realized with another computer capable of communicating with the storage apparatus 112.

The updating information management unit 510 monitors the update processing of the backup data to be used in the secondary use of data performed by an updating information unit 810 described later, and manages an updating information management table 511, which is a copy of an updating information management table 811 registered as updating information. Details of the updating information management table 511, 811 will be described in detail later with reference to FIG. 9.

Once masking processing is performed to the backup data, the masking information management unit 520 registers, in the masking information management table 521, masking information including information on which block has been updated. The masking information management table 521 will be explained later with reference to FIG. 10.

The storage micro program 530 is software for managing and controlling the storage apparatus 112. The storage micro program 530 has general storage functions (for example, provision of logical volumes, provision of logical pools obtained by logically consolidating a plurality of resources, etc.).

A data control unit 540 creates difference data, which is data of the difference from the masking data to be used as the basis upon creating the data requested to be used. The creation of difference data is realized by managing, in block units, the physical volume 230 as the target of difference data based on the masking information management table 521 and the updating information management table 511. Details on the method of creating difference data will be explained later with reference to FIG. 14.

Figure 6:
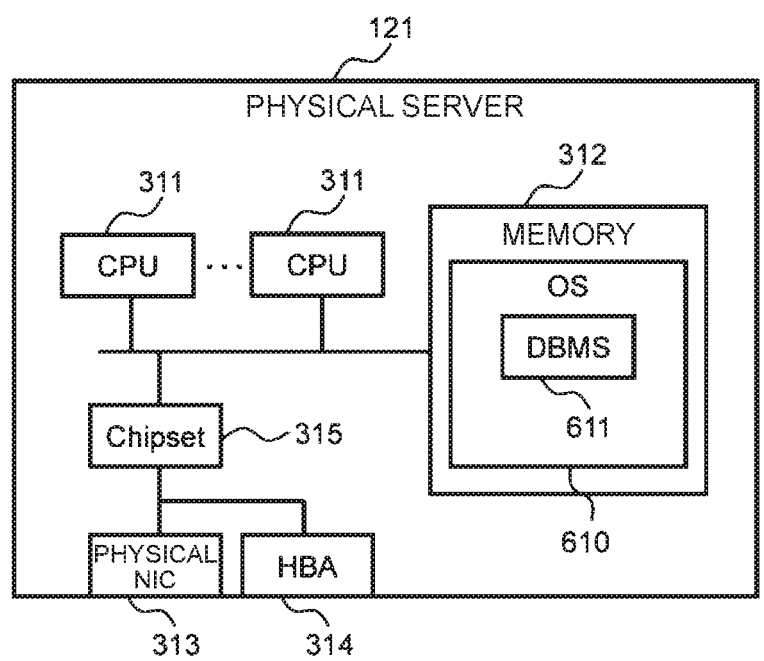
FIG. 6 is a diagram showing an example of the configuration of the physical server according to the first embodiment.

FIG. 6 is a diagram showing an example of the configuration of the physical server 121 of the production system 120.

The memory 312 of the physical server 121 stores various programs, tables and the like. As a result of the CPU 311 executing programs of the memory 312, the functions (OS 610, DBMS 611, etc.) of the physical server 121 are realized.

The functions of the physical server 121 may be realized, for example, by the CPU 311 reading programs from the memory 312 and executing such programs (software), or realized with hardware such as a dedicated circuit, or realized based on the combination of software and hardware. Moreover, a part of the functions of the physical server 121 may be realized with another computer capable of communicating with the physical server 121.

In the physical server 121, an OS 610 is running, and a DBMS 611 is realized based on the OS 610. The DBMS 611 manages, for example, the real data that is updated or referenced in business.

Figure 7:
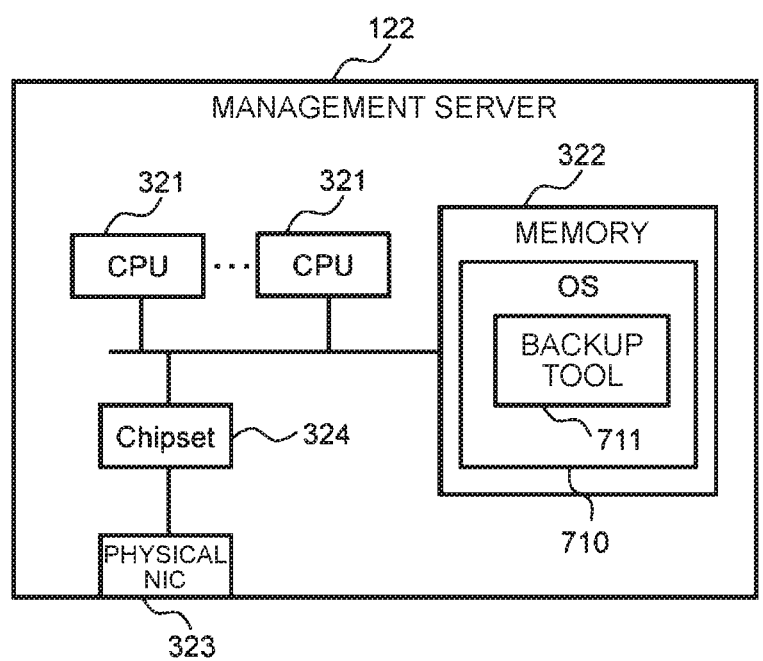
FIG. 7 is a diagram showing an example of the configuration of the management server according to the first embodiment.

FIG. 7 is a diagram showing an example of the configuration of the management server 122 of the production system 120.

The memory 322 of the management server 122 stores various programs, tables and the like. As a result of the CPU 321 executing programs of the memory 322, the functions (OS 710, backup tool 711, etc.) of the management server 122 are realized.

The functions of the management server 122 may be realized, for example, by the CPU 321 reading programs from the memory 322 and executing such programs (software), or realized with hardware such as a dedicated circuit, or realized based on the combination of software and hardware. Moreover, a part of the functions of the management server 122 may be realized with another computer capable of communicating with the management server 122.

In the management server 122, an OS 710 is running, and a backup tool 711 is realized based on the OS 710.

The backup tool 711 executes the backup of the DBMS 611 in various units (difference backup, full backup, etc.) by issuing commands to the DBMS 611 and the storage micro program 820 of the storage apparatus 123, executes backup processing to the physical volume 340 of the storage apparatus 123, and thereby generates backup data of the real data.

Figure 8:
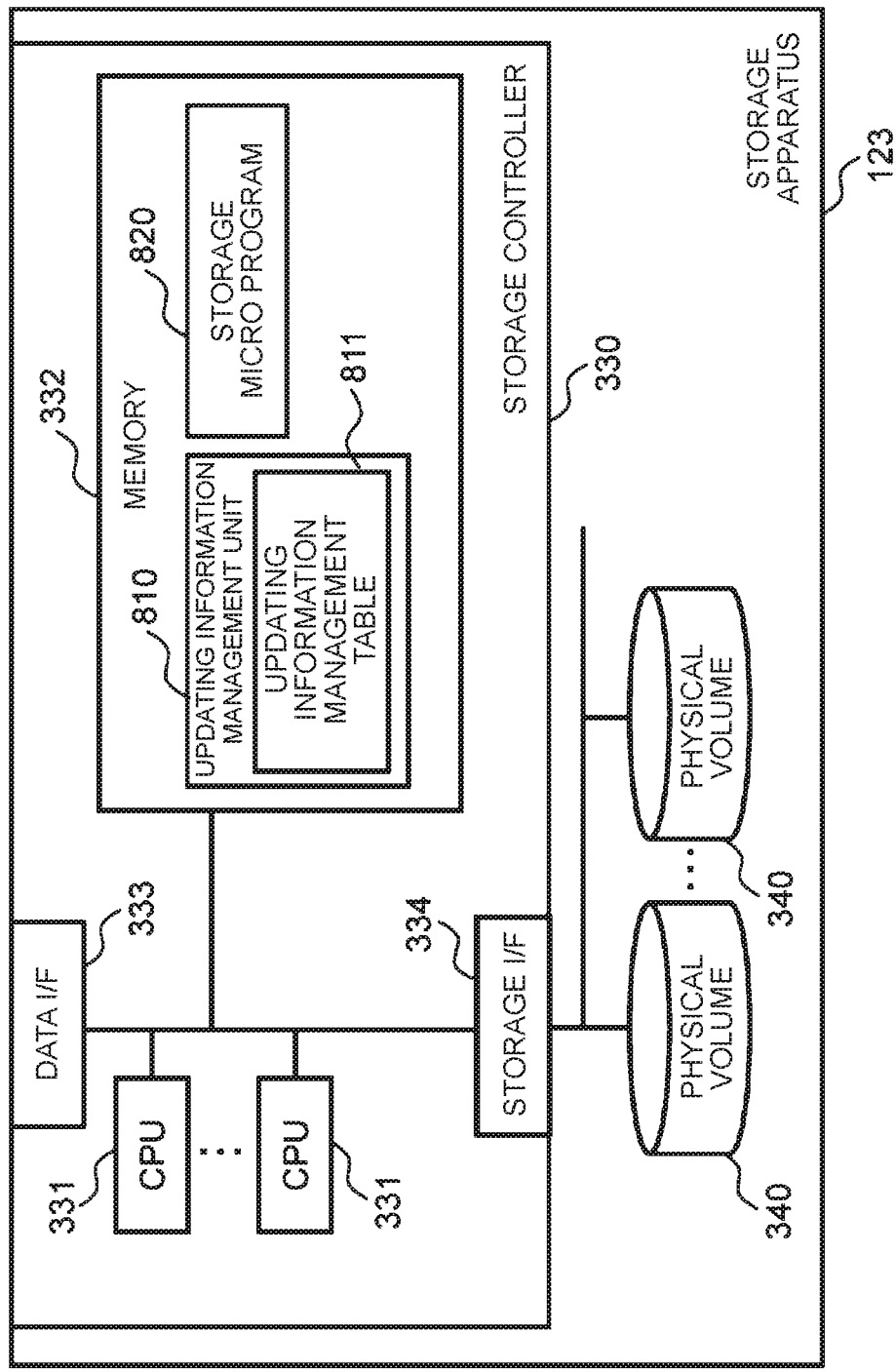
FIG. 8 is a diagram showing an example of the configuration of the storage apparatus according to the first embodiment.

FIG. 8 is a diagram showing an example of the configuration of the storage apparatus 123 of the production system 120.

The storage apparatus 123 of the production system 120 basically has the same configuration as the storage apparatus 112 of the development system 110, but without the masking information management unit 520 and the data control unit 540.

In the storage apparatus 123, as a result of the CPU 321 executing programs of the memory 332, the functions (updating information management unit 810, storage micro program 820, etc.) of the storage apparatus 123 are realized.

The functions of the storage apparatus 123 may be realized, for example, by the CPU 321 reading programs from the memory 322 and executing such programs (software), or realized with hardware such a dedicated circuit, or realized based on the combination of software and hardware. Moreover, a part of the functions of the storage apparatus 123 may be realized with another computer capable of communicating with the storage apparatus 123.

The updating information management unit 810 monitors the update processing of real data related to business, and registers the result as updating information in the updating information management table 811. Details of the updating information management table 811 will be described later with reference to FIG. 9.

Because the storage micro program 820 is the same as the storage micro program 530, the explanation thereof is omitted.

FIG. 9 is a diagram showing an example of the updating information management table 511, 811. Because the updating information management table 511 and the updating information management table 811 have the same data structure, FIG. 9 provides an explanation by taking the updating information management table 511 as an example.

The updating information management table 511 is managed by the updating information management unit 510, and stores information (updating information) related to the update data of backup data.

More specifically, the updating information management table 511 stores information of a data item 910 (Vol ID), a data item 920 (Vol name), a data item 930 (generation ID), a data item 940 (Block ID), a data item 950 (update flag), a data item 960 (update data), and a data item 970 (label) by associating such information.

The data item 910 stores the identification number of the physical volume 230. The data item 920 stores the name of the physical volume 230. The data item 930 stores, as the generation information, the identifier of the update data. The generation information is information representing the execution date of masking processing, and the version of the masking rule of masking processing. The data item 940 stores the identification number of the block (storage area). Note that the physical volume 230 is managed (reading and writing of data) in block units. The data item 950 stores "1" when the data of the block (target block) of the data item 940 is updated, and stores "0" when the data of the target block is not updated. The data item 960 stores the update data of the target block. The data item 970 stores the purpose of use of the physical volume 230. The data item 970 may be set manually, or set automatically with a tool or the like.

FIG. 10 is a diagram showing an example of the masking information management table 521.

The masking information management table 521 is managed by the masking information management unit 520, and stores information (masking information) related to the masking data when masking processing is performed to backup data.

More specifically, the masking information management table 521 stores information of a data item 1010 (Vol ID), a data item 1020 (Vol name), a data item 1030 (generation ID), a data item 1040 (Block ID), a data item 1050 (update flag), a data item 1060 (masking flag), a data item 1070 (masking data), and a data item 1080 (label) by associating such information.

The data items 1010, 1020, 1030, 1040, 1050, 1080 store the same information as the data items 910, 920, 930, 940, 950, 970 of the updating information management table 511. However, because the data items 1010, 1020, 1030, 1040, 1050, 1080 are not called at the same timing as the data items 910, 920, 930, 940, 950, 970 of the updating information management table 511, the same values are not stored therein.

The data item 1060 stores "1" when the masking/non-masking during the masking processing is managed in column units (bit units) and updated, and stores "0" when it is not updated. The data item 1070 stores the data that was masked (masking data) when the masking processing was actually performed.

Figure 11:
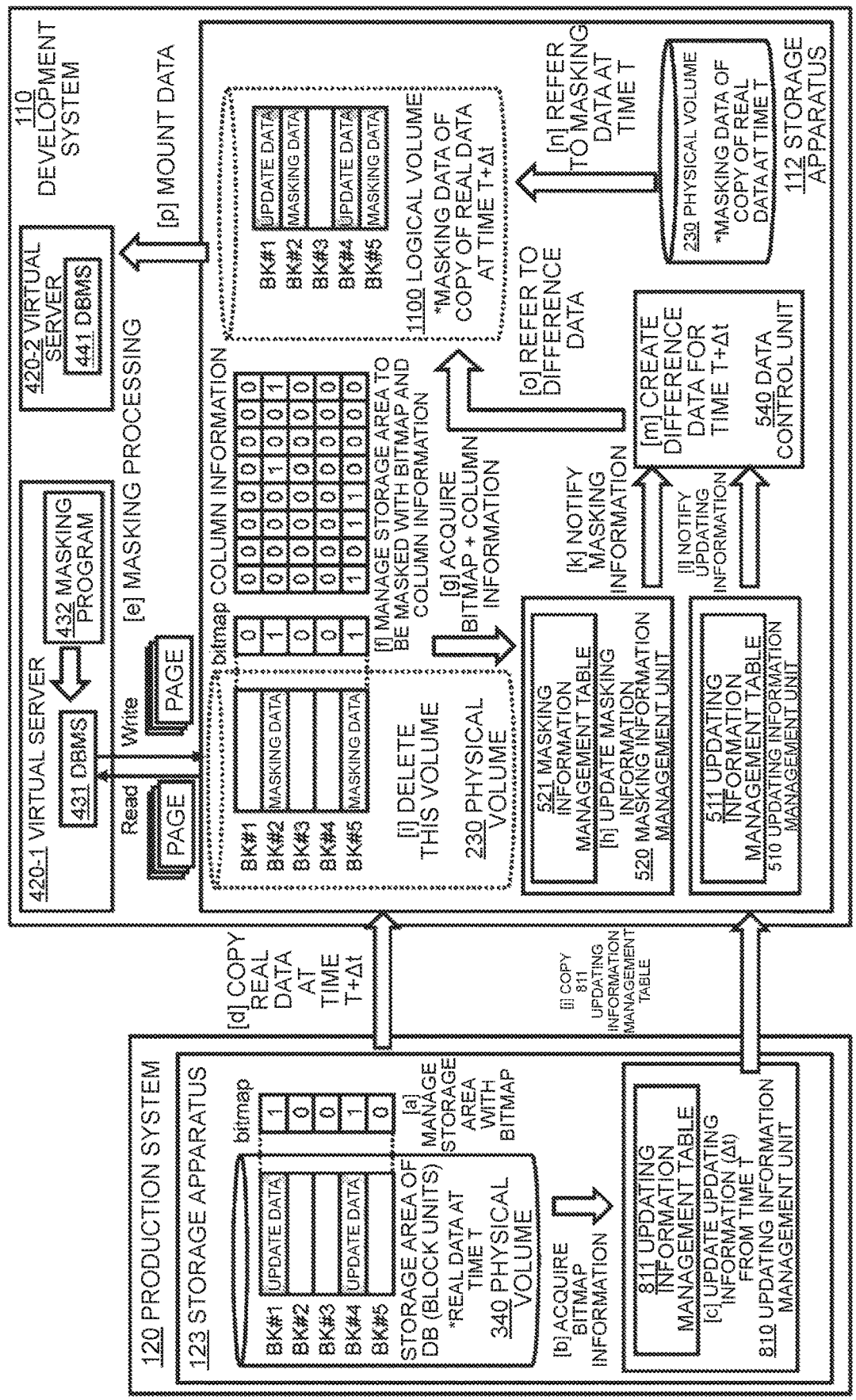
FIG. 11 is a diagram showing an overview of the method of reducing the capacity used in the storage apparatus according to the first embodiment.

FIG. 11 is a diagram showing an overview of the method of reducing the capacity used in the storage apparatus 112 during the secondary use of data. In FIG. 11, the backup data at time T of the DBMS 611 running on the production system 120 is copied to the storage apparatus 112 of the development system 110, and is based on the premise that the operation of the secondary use of data has been started in the development system 110.

Foremost, in the production system 120, the physical volume 340 to become the original data of the backup data at time T that was copied to the development system 110 undergoes bitmap management in block units (processing [a]). Here, bitmap management refers to the management of update/non-update of each block based on a bit ("0" or "1"). The updating information management unit 510 acquires information (bitmap information) of update/non-update of each block based on bitmap management (processing [b]), and reflects the result in the updating information management table 811 as updating information together with the update data from time T (processing [c]).

Here, this is based on the premise that a request for using data at time T+Δt has been issued from the development system 110. Based on this request for use, the backup tool 711 of the production system 120 copies the backup data at time T+Δt to the storage apparatus 112 of the development system 110 (processing [d]).

In the development system 110, the copied backup data at time T+Δt is mounted on the virtual server 420-1, and the masking program 432 executes masking processing (processing [e]). The masking information management unit 520 manages the processing status of masking processing based on the masking/non-masking (bitmap information) the physical volume 230 in block units according to a bitmap and the masking data (column information) (processing [f]). The masking information management unit 520 acquires the bitmap information and the column information (processing [g]), and updates the masking information management table 521 with the acquired information as the masking information (processing [h]). The data control unit 540 deletes the backup data at time T+Δt stored in the physical volume 230 after the foregoing update processing is completed (processing [i]).

In the production system 120, because the updating information management unit 810 stores the updating information of time T onward in the updating information management table 811, the updating information management unit 810 transfers the updating information management table 811 to the updating information management unit 510 of the development system 110 (processing [j]).

The data control unit 540 acquires the masking information management table 521 from the masking information management unit 520 (processing [k]), acquires the updating information management table 511 from the updating information management unit 510 (processing [l]), and creates difference data for performing an update after time Δt to be applied to the masking data at time T that is being used (secondary use of data) in the development system 110 (processing [m]).

The data control unit 540 refers to the masking data at time T (processing [n]) and refers to the generated difference data (processing [o]), and thereby mounts, on the virtual server 420-2, the logical volume 1100 in which the update (difference data) from time T to time T+Δt has been applied to the masking data at time T (processing [p]).

Based on the processing described above, the development system 110 is able to perform the secondary use of data based on the masking data at time T+Δt generated based on the masking data at time T of the difference data.

The series of processing of the method of reducing the capacity used in the storage apparatus 112 during the secondary use of data is now explained with reference to flowcharts.

Figure 12:
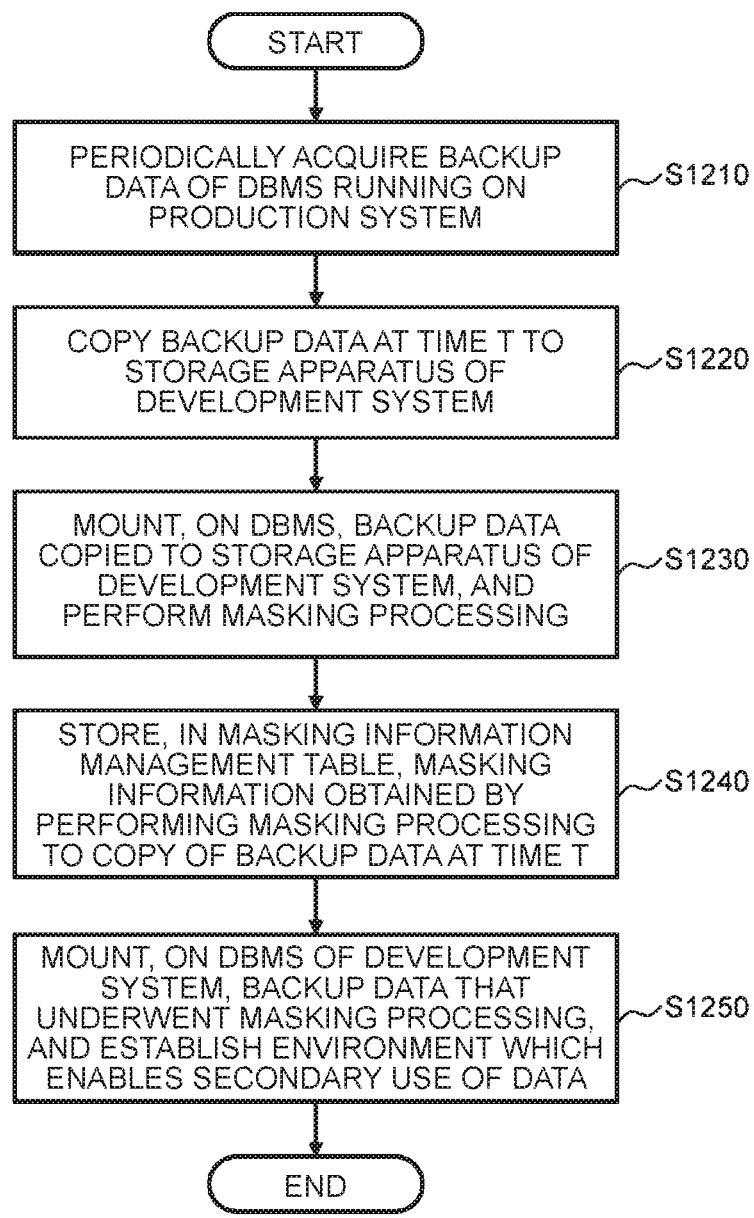
FIG. 12 is a diagram showing an example of the flowchart according to the first embodiment.

FIG. 12 is a diagram showing an example of the flowchart of the processing of copying the backup data at time T.

Foremost, the backup tool 711 periodically acquires the backup data of the DBMS 611 which runs on the production system 120 (step S1210).

The backup tool 711 of the production system 120 copies the acquired backup data at time T to the storage apparatus 112 of the development system 110 based on a request for use from the administrator of the development system 110 or a periodic update request of backup data copied to the development system 110 (step S1220).

The data control unit 540 mounts, on the DBMS 431, the backup data copied to the storage apparatus 112 of the development system 110, and performs masking processing based on the masking program 432 (step S1230).

The masking information management unit 520 of the development system 110 stores, in the masking information management table 521, the masking information of the masking processing to the copy of the backup data at time T (step S1240).

The data control unit 540 mounts, on the DBMS 441 of the development system 110, the backup data that underwent masking processing, and builds an environment which enables the secondary use of data (step S1250).

Figure 13:
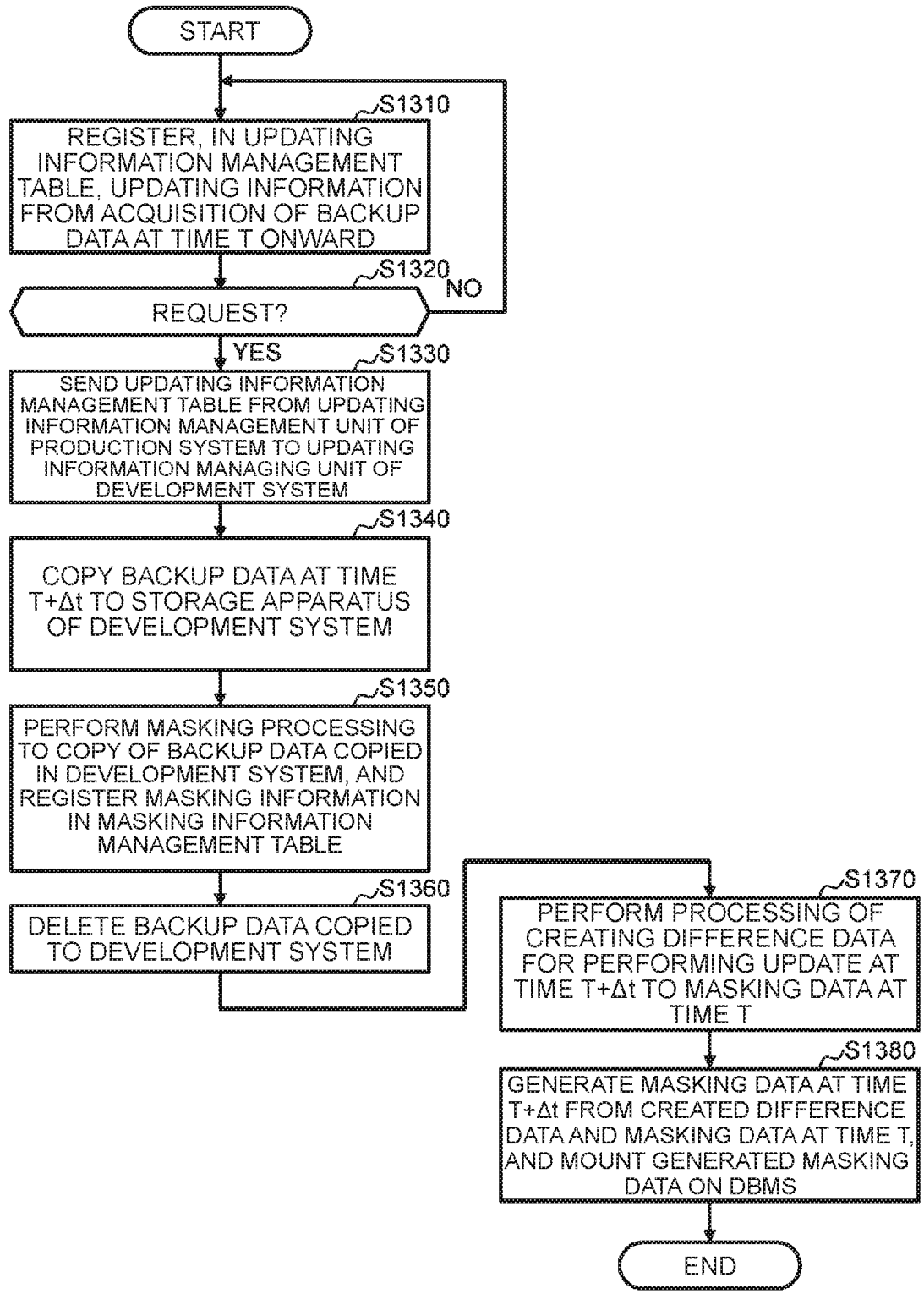
FIG. 13 is a diagram showing an example of the flowchart according to the first embodiment.

FIG. 13 is a diagram showing an example of the flowchart of the processing of copying the backup data at time T+Δt to the development system 110.

Foremost, the updating information management unit 810 of the production system 120 registers, in the updating information management table 811, the updating information on and after the backup acquisition at time T (step S1310).

The updating information management unit 810 of the production system 120 stands by until a request for updating information at time T onward is received by the development system 110 (step S1320).

When there is a request, the updating information management unit 810 transfers the updating information management table 811 to the updating information management unit 510 of the development system 110 (step S1330).

The backup tool 711 of the production system 120 copies the backup data at time T+Δt to the storage apparatus 112 of the development system 110 (step S1340).

The masking program 432 of the development system 110 performs masking processing to the backup data copied to the development system 110, and the masking information management unit 520 registers the masking information in the masking information management table 521 (step S1350).

The data control unit 540 of the development system 110 deletes the backup data copied to the development system 110 after the masking information management unit 520 registers the masking information in the masking information management table 521 (step S1360).

The data control unit 540 of the development system 110 performs processing of creating difference data of performing an update at time T+Δt to the masking data at time T (step S1370). The corresponding processing will be explained later with reference to FIG. 14.

The data control unit 540 of the development system 110 generates masking data at time T+Δt from the generated difference data and the masking data at time T, and mounts the generated masking data on the DBMS 441 (step S1380).

Figure 14:
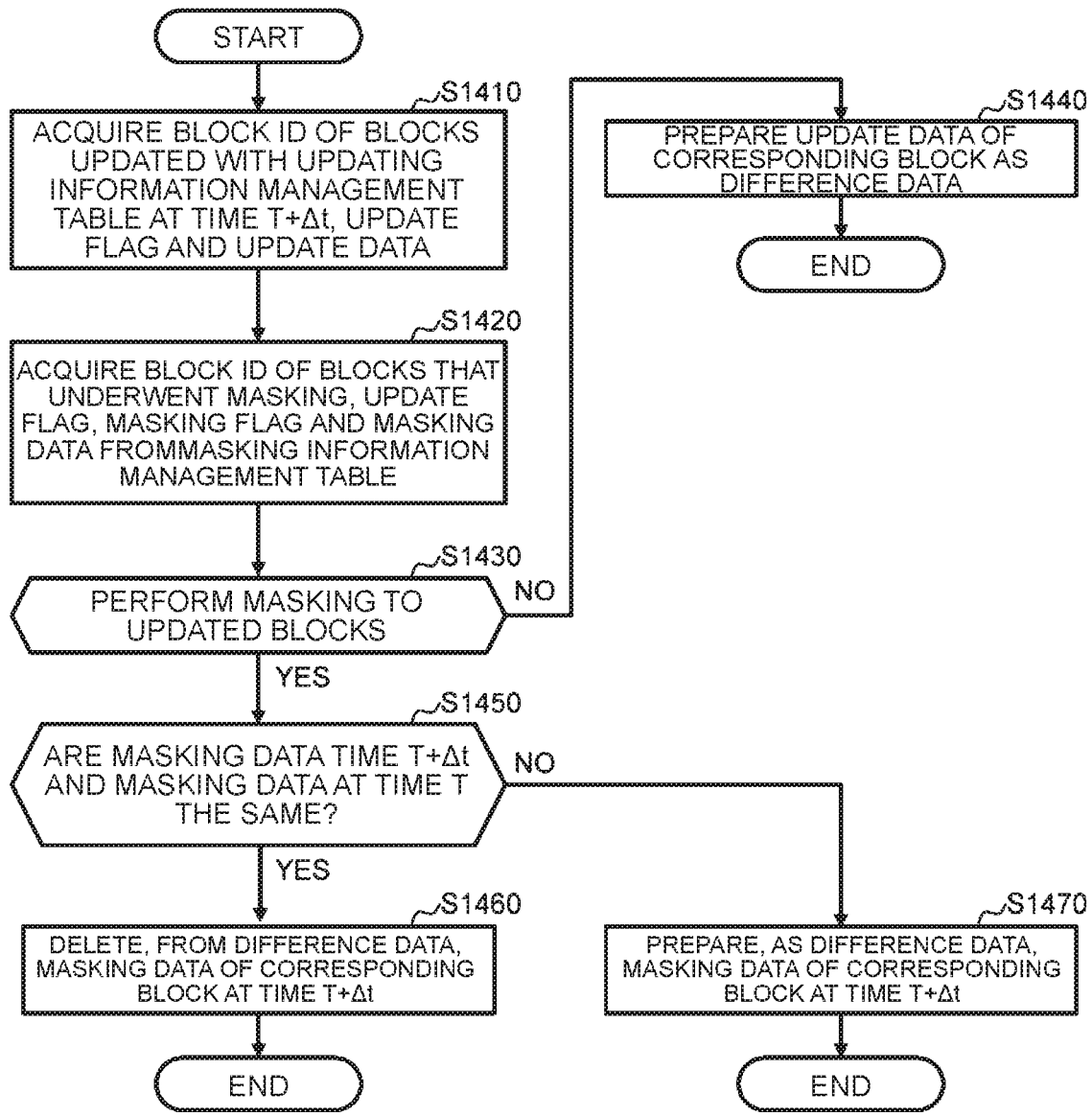
FIG. 14 is a diagram showing an example of the flowchart according to the first embodiment.

FIG. 14 is a diagram showing an example of the flowchart of the more specific processing of the processing (step S1370) for creating the difference data explained in FIG. 13.

Foremost, the data control unit 540 acquires the block ID of the block updated in the updating information management table 811 at time T+Δt acquired by the development system 110, the update flag, and the update data from the updating information management unit 810 of the production system 120 (step S1410).

The data control unit 540 acquires, from the masking information management table 521, the data of the data item 1040 to the data item 1070 (block ID, update flag, masking flag, masking data) of the blocks that were masked by the masking information management unit 520 (step S1420).

The data control unit 540 determines, based on the acquired information, whether masking was performed to the blocks that were updated from time T to time T+Δt (step S1430). The data control unit 540 performs the processing of step S1450 for the blocks that underwent masking, and performs the processing of step S1440 for the blocks that did not undergo masking.

With regard to the blocks that did not undergo masking, the data control unit 540 prepares, as difference data, the update data (updating information) of the data item 960 of the block ID of the corresponding block (step S1440).

With regard to the blocks that underwent masking, the data control unit 540 determines whether the masking data of the data item 1070 of the corresponding block at time T+Δt and the masking data of the data item 1070 of the corresponding block at time T are the same (step S1450). The data control unit 540 performs the processing of step S1460 to the blocks that are determined to be the same, and performs the processing of step S1470 to the blocks that are determined to be different.

The data control unit 540 deletes, from the difference time T+Δt data, the masking data of the data item 1070 of the corresponding block at time T+Δt for the blocks having the same data (step S1460).

The data control unit 540 prepares, as difference data, the masking data (masking information) of the data item 1070 of the corresponding block at time T+Δt for the blocks having different data (step S1470).

Based on the foregoing processing, because the development system 110 can apply the difference data at time T+Δt to the masking data at time T, there is no need to separately own real data according to multiple users or purposes of use, the copying of real data can be suppressed, and the consumption of capacity of the storage apparatus 112 can be resolved.

Here, because there is also a concern that difference data may increase in the development system 110, the configuration may be such that the data control unit 540 monitors the capacity of the difference data. For example, the data control unit 540 monitors whether the capacity of the masking data to be used as the basis upon generating the data requested to be used has exceeded the capacity of the difference data. The data control unit 540 performs processing for integrating the real data (processing of generating masking data to be used as the new basis) when it is determined that the capacity of the masking data has exceeded the capacity of the difference data. Based on the foregoing configuration, it is possible to further resolve the consumption of capacity of the storage apparatus 112. The foregoing configuration is now explained with reference to FIG. 15.

Figure 15:
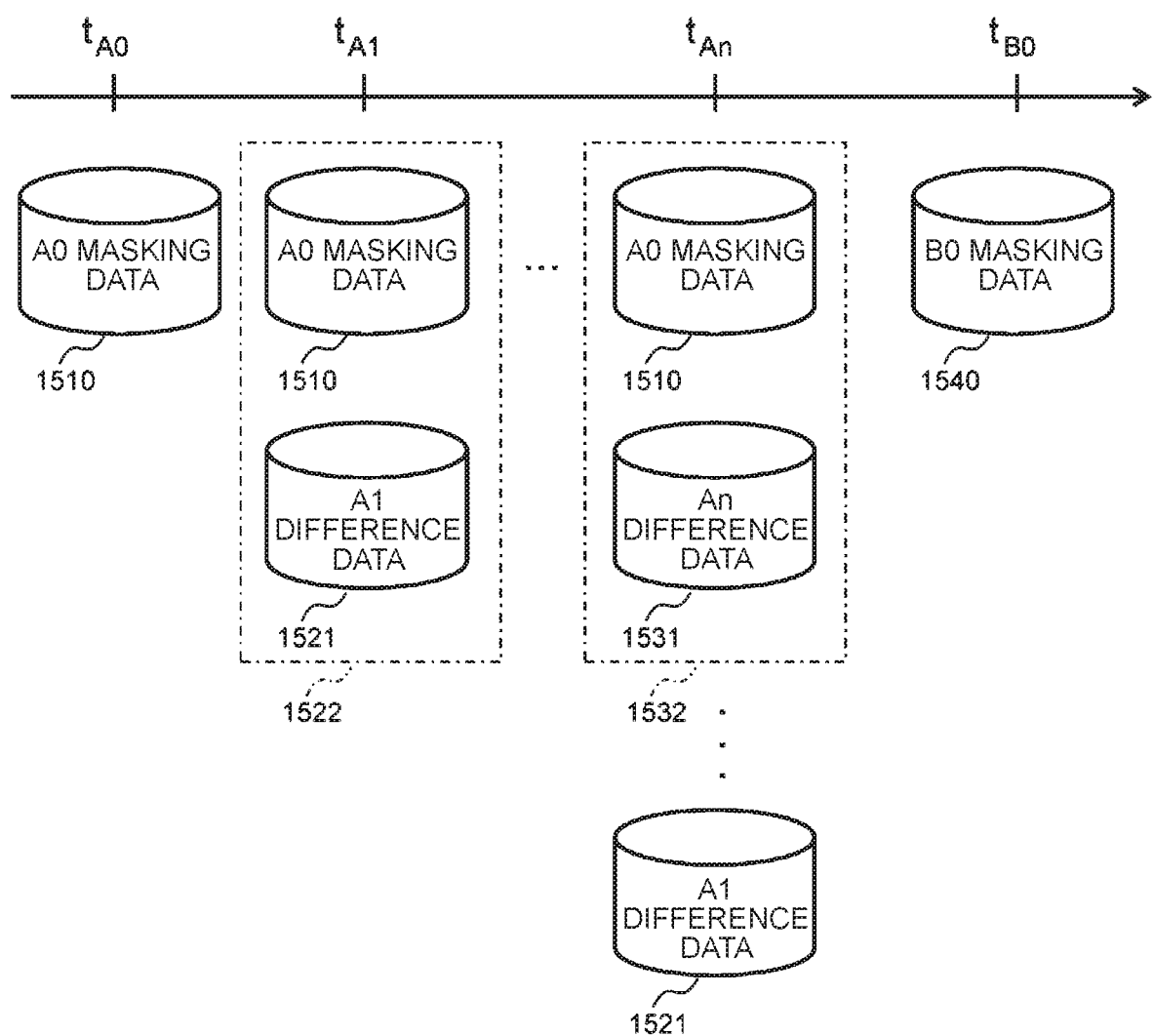
FIG. 15 is a diagram explaining the relationship of the masking data and the difference data according to the first embodiment.

FIG. 15 is a diagram explaining the relationship of the masking data and the difference data. Here, a case in which difference data is generated at time $t_{A1}$, . . . , time $t_{An}$ is shown. Let it be assumed that A0 masking data 1510 to become the basis when generating the data requested to be used at time $t_{A0}$ has been stored in the storage apparatus 112.

At time $t_{A1}$, A1 difference data 1521 is generated. When a request for use is made at $t_{A1}$, the data requested to be used 1522 is generated from the A0 masking data 1510 and the A1 difference data 1521.

After the A1 difference data 1521 is generated, the data control unit 540 compares the capacity of the A0 masking data 1510 and the capacity of the A1 difference data 1521. Here, let it be assumed that the capacity of the A0 masking data 1510 is a first capacity, and the capacity of the A1 difference data 1521 is a second capacity that is smaller than the first capacity. The data control unit 540 does not do anything because the capacity of the A1 difference data 1521 is smaller than the capacity of the A0 masking data 1510 (processing of generating the masking data to be used as the new basis is not performed).

At time $t_{An}$, An difference data 1531 is generated. When a request for use is made at time $t_{An}$, the data 1532 requested to be used is generated from the A0 masking data 1510 and the An difference data 1531.

After the An difference data 1531 is generated, the data control unit 540 compares the capacity of the A0 masking data 1510 and the capacity of the An difference data 1531. Here, let it be assumed that the capacity of the A0 masking data 1510 is a first capacity, and the capacity of the An difference data 1531 is a third capacity that is larger than the first capacity. Because the capacity of the An difference data 1531 is larger than the capacity of the A0 masking data 1510, the data control unit 540 recreates the masking data to be used as the basis at a predetermined timing (time $t_{B0}$).

As a result of performing the foregoing processing, the consumption of capacity of the storage apparatus 112 can be resolved.

Moreover, in this embodiment, the consumption of capacity of the storage apparatus 112 was resolved by generating difference data at time T+Δt in which masking data having the same value has been omitted. By subjecting this difference data to generation management according to each masking rule, it will be easy to return to the masking data of a masking rule of a certain point in time, or return to the masking data of a masking rule at time T.

(2) Other Embodiments

While the foregoing embodiment explained a case of applying the present invention to a data management system, the present invention is not limited thereto, and may be broadly applied to various other systems, devices, methods, and programs.

Moreover, while the foregoing embodiment explained processing with a "program" as the subject, because a program, as a result of being executed by a processor unit, performs predetermined processing while using a storage unit (for example, memory) and/or an interface unit (for example, communication port) as needed, the subject of processing may also be a processor. The processing explained with a program as the subject may also be processing that is performed by a processor unit or a device equipped with such a processor unit. Moreover, the processor unit may include a hardware circuit (for example, FPGA (Field-Programmable Gate Array) or ASIC (Application Specific Integrated Circuit)) which performs a part or all of the processing. A program may also be installed in a device such as a computer from a program source. A program source may be, for example, a program distribution server or a computer-readable recording medium (for example, non-temporary recording medium). Moreover, in the ensuing explanation, two or more programs may be realized as one program, and one program may be realized as two or more programs.

Moreover, in the foregoing embodiment, a "processor unit" is one or more processors. At least one processor is typically a micro processor such as a CPU, it may also be another type of processor such as a GPU (Graphics Processing Unit). At least one processor may be a single-core processor or a multi-core processor. At least one processor may be a broad processor such as a hardware circuit (for example, FPGA (Field-Programmable Gate Array) or ASIC (Application Specific Integrated Circuit)) which performs a part or all of the processing.

Moreover, in the foregoing embodiment, the configuration of the respective tables is merely an example, and one table may be divided into two or more tables, and all or a part of the two or more tables may be one table.

Moreover, in the foregoing embodiment, while the various types of data were explained using XX tables and XX files for the sake of convenience of explanation, the data structure is not limited thereto, and may also be expressed as XX information.

Moreover, in the foregoing explanation, information such as programs, tables and files that realize the respective functions may be stored in a memory, a storage device such as a hard disk or SSD (Solid State Drive), or a recording medium such as an IC card, SD card, or DVD.

The present invention has, for instance, the following characteristic configuration.

The present invention is characterized in comprising a storage unit (for example, DBMS 441) which stores masked data (for example, masking data) of real data at a first point in time (for example, time T), and a data control unit (for example, data control unit 540) which extracts, based on first information (for example, masking information management table 521 at time T) representing a masked storage area in the masked data and second information (for example, masking information management table 521 at time T+Δt) representing a masked storage area in the masked data of update data, which is data obtained by updating the real data from the first point in time to a second point in time, data of a storage area that has not been masked from the update data, extracts data of the masked storage area, from which the same masked data has been removed, from the masked data of the update data, and generates the extracted data as difference data.

According to the foregoing configuration, for instance, because it will be possible to generate data requested to be used from the masked data and the difference data, there is no need to prepare real data for each request for use. Moreover, for example, because the masked data that is the same at the first point in time and the second point in time will be removed from the difference data, the data capacity can be reduced.

The present invention further comprises a masking information management unit (for example, masking information management unit 520) which generates in block units, as the first information, information (for example, masking flag) representing whether or not masking has been performed in the masked data, and generates in block units, as the second information, information (for example, masking flag) representing whether or not masking has been performed in the masked data of the update data, and the data control unit extracts data in block units which has not been masked from the update data based on the first information and the second information, extracts data in block units which has been masked, from which the same data as the masked data has been removed in block units, from the masked data of the update data, and generates the extracted data as the difference data.

According to the foregoing configuration, for instance, by handling the data in block units accessed by the DBMS, the storage area of the storage apparatus can be managed efficiently.

The data control unit extracts data that has been updated from the masked data of the data source and generates the masked data of the update data based on a data source of the real data from the first point in time to the second point in time and information (for example, updating information management table 511) representing whether the masked data of the data source has been updated, which are sent from a production system (for example, step S1410).

According to the foregoing configuration, the masked data of update data can be narrowed down into block units from the masked data of the data source.

The data control unit applies the difference data to the masked data and generates data at the second point in time according to a request (for example, request for use) for using the data at the second point in time.

According to the configuration, for instance, when there are various requests for use depending on multiple users or usages such as development and analysis, because difference data is generated for each request for use in the foregoing configuration, there is no need maintain the masking data of real data for each request for use, and the consumption of capacity of the storage apparatus can be resolved.

The data control unit generates the difference data based on a change in a masking processing rule.

According to the foregoing configuration, for instance, because difference data is generated each time the masking processing rule is changed, the user can use data when the intended masking processing rule is applicable.

The data control unit determines whether a capacity of the generated difference data has exceeded a capacity of the masked data, and, upon determining that the capacity of the generated difference data has exceeded the capacity of the masked data, generates masked data of real data at a predetermined point in time, and, from the predetermined point in time onward, generates difference data from the masked data of the real data at the predetermined point in time.

According to the foregoing configuration, by generating difference data, a situation where the capacity of the storage apparatus is consumed can be avoided.

Moreover, the foregoing configurations may be suitably changed, rearranged, combined or omitted to the extent that such change, rearrangement, combination or omission does not deviate from the subject matter of the present invention.

While the embodiments of the present invention have been explained above, the technical scope of the present invention is not limited to the scope described in the foregoing embodiments. While the invention devised by the present inventors was specifically explained based on the foregoing embodiments, it goes without saying that the invention may be variously modified or improved to the extent that such modification or improvement does not deviate from the subject matter of the invention. Accordingly, modes including such modification or improvement are also covered by the technical scope of the present invention as a matter of course.

REFERENCE SIGNS LIST

100 . . . data management system, 110 . . . development system, 120 . . . production system.

The invention claimed is:

1. A data management system, comprising:
a storage unit which stores first masked data of real data at a first point in time; and
a data control unit which
extracts, first information representing a masked storage area in the first masked data and second data of update data obtained by updating the real data from the first point in time to a second point in time,
determines if the second data is second information representing a second masked storage area in second masked data of the update data,
on a condition that the second data is not second information, determine that the second data is data of a storage area that has not been masked from the update data, and generate the second data as difference data, and
on a condition that the second data is second information, determine whether the first masked data and the second masked data are identical, extracts identical data of the first masked storage area from the second masked data, and generates remaining data in the second masked data after the identical data is extracted as the difference data.

2. The data management system according to claim 1, further comprising:
a masking information management unit which generates in block units, as the first information, information representing whether or not masking has been performed in the first masked data, and generates in block units, as the second information, information representing whether or not masking has been performed in the second masked data.

3. The data management system according to claim 1, wherein the data control unit which extracts data that has been updated from the first masked data and generates the second masked data based on a data source of the real data from the first point in time to the second point in time and information representing whether the masked data of the data source has been updated, which are sent from a production system.

4. The data management system according to claim 1, wherein the data control unit applies the difference data to the first masked data and generates data at the second point in time according to a request for using the data at the second point in time.

5. The data management system according to claim 1, wherein the data control unit generates the difference data based on a change in a masking processing rule.

6. The data management system according to claim 1, wherein the data control unit determines whether a capacity of the generated difference data has exceeded a capacity of the first masked data, and, upon determining that the capacity of the generated difference data has exceeded the capacity of the first masked data, generates new masked data of real data at a predetermined future point in time, and, from the predetermined future point in time onward, generates difference data from the new masked data of the real data at the predetermined point in time.

7. A data management method, comprising:
storing, via a storage unit, first masked data of real data at a first point in time;
extracting, via a data control unit, first information representing a masked storage area in the first masked data and second data of update data obtained by updating the real data from the first point in time to a second point in time;

determining, if the second data is second information representing a second masked storage area in second masked data of the update data, determining, on a condition that the second data is not second information, that the second data is data of a storage area that has not been masked from the update data, and generating the second data as difference data; and determining, on a condition that the second data is second information, whether the first masked data and the second masked data are identical, extracting identical data of the first masked storage area from the second masked data, and generating remaining data in the second masked data after the identical data is extracted as the difference data.

\* \* \* \* \*